United States Patent
Yan et al.

(10) Patent No.: US 10,998,972 B2
(45) Date of Patent: May 4, 2021

(54) RECEIVER, METHOD, TERMINAL DEVICE, LIGHT TRANSMISSIVE STRUCTURE AND SYSTEM FOR VISIBLE LIGHT COMMUNICATION

(71) Applicant: SIGNIFY HOLDING B.V., Eindhoven (NL)

(72) Inventors: Caijie Yan, Eindhoven (NL); Shengli Zhang, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/461,288

(22) PCT Filed: Nov. 14, 2017

(86) PCT No.: PCT/EP2017/079200
§ 371 (c)(1),
(2) Date: May 15, 2019

(87) PCT Pub. No.: WO2018/091463
PCT Pub. Date: May 24, 2018

(65) Prior Publication Data
US 2020/0076505 A1  Mar. 5, 2020

(30) Foreign Application Priority Data

Nov. 16, 2016  (WO) ............... PCT/CN2016/106113
Mar. 6, 2017  (EP) ............................. 17159285

(51) Int. Cl.
*H04B 10/116* (2013.01)
*G01J 1/04* (2006.01)
*G01J 1/06* (2006.01)

(52) U.S. Cl.
CPC .......... *H04B 10/116* (2013.01); *G01J 1/0437* (2013.01); *G01J 1/06* (2013.01)

(58) Field of Classification Search
CPC ................................................. H04B 10/116
See application file for complete search history.

(56) References Cited

U.S. PATENT DOCUMENTS 6,853,445 B2   2/2005   Perkins et al.
8,681,137 B2   3/2014   Wong et al.
(Continued)

FOREIGN PATENT DOCUMENTS

CN   102967307 A   3/2013
JP   2002109778 A   4/2002
(Continued)

OTHER PUBLICATIONS

Tron-Hop Do, et al, "An in-Depth Survey of Visible Light Communication Based Positioning Systems", https://www.ncbi.nlm.ih.gov/pmc/articles/PMC4883369/ May 12, 2016, pp. 1-51.

*Primary Examiner* — Nathan M Cors
(74) *Attorney, Agent, or Firm* — Akarsh P. Belagodu

(57) ABSTRACT

A receiver, method, terminal device, visible light transmissive structure and system for decoding light signals and light signals received in an area of overlap of light rays emanating from different lighting devices, each transmitting unique ID data. Light rays (45, 46, 47) entering the receiver (39) are optically spread apart in longitudinal direction (x) of an array of photodetectors (21). The thus spread light rays (45a, 46a, 47a) are optically diverged and spread further over the radiant active surface (29) of a particular photodetector (22-28), thereby optimizing the amount of light received at a respective photodetector (22-28).

15 Claims, 5 Drawing Sheets

(56) References Cited

U.S. PATENT DOCUMENTS

| | | | |
|---|---|---|---|
| 9,014,564 B2* | 4/2015 | Roberts | H04B 10/116 |
| | | | 382/280 |
| 2001/0040713 A1* | 11/2001 | Haruyama | H04B 10/1143 |
| | | | 398/140 |
| 2001/0043381 A1 | 11/2001 | Green et al. | |
| 2002/0109884 A1 | 8/2002 | Presley et al. | |
| 2003/0223764 A1* | 12/2003 | Chan | H04B 10/1141 |
| | | | 398/207 |
| 2009/0123156 A1 | 5/2009 | Son et al. | |
| 2010/0226661 A1* | 9/2010 | Hiraizumi | H04B 10/07953 |
| | | | 398/194 |
| 2011/0176803 A1 | 7/2011 | Song et al. | |
| 2012/0012738 A1* | 1/2012 | Shinada | G02B 6/26 |
| | | | 250/226 |
| 2015/0349881 A1 | 12/2015 | Byers | |
| 2016/0238836 A1* | 8/2016 | Oganesian | G02B 27/005 |

FOREIGN PATENT DOCUMENTS

| | | |
|---|---|---|
| JP | 2008287053 A | 11/2008 |
| JP | 2016526294 A | 9/2016 |
| WO | 2016086276 A1 | 6/2016 |

\* cited by examiner

RECEIVER, METHOD, TERMINAL DEVICE, LIGHT TRANSMISSIVE STRUCTURE AND SYSTEM FOR VISIBLE LIGHT COMMUNICATION

CROSS-REFERENCE TO PRIOR APPLICATIONS

This application is the U.S. National Phase application under 35 U.S.C. § 371 of International Application No. PCT/EP2017/079200, filed on Nov. 14, 2017, which claims the benefit of European Patent Application No. 17159285.0, filed on Mar. 6, 2017, and Chinese Patent Application No. PCT/CN2016/106113, filed on Nov. 16, 2016. These applications are hereby incorporated by reference herein.

TECHNICAL FIELD

The present disclosure generally relates to the field of optical communication and, more particularly, to a receiver, a method and a terminal device comprising a receiver for receiving and processing visible light signals in a visible light communication system. The disclosure further relates to a visible light transmissive structure of the receiver.

BACKGROUND

Visible Light Communication, VLC, in particular VLC based positioning, is emerging as an attractive indoor positioning technology for determining the positioning of mobile terminals.

VLC can be installed with existing and new lighting devices or luminaires, such that the lighting equipment not only serves the purpose of lighting but also provides data communication. Accordingly, VLC provides an efficient power consumption, as the light signal emitted contributes to both lighting and communication.

Since VLC does not cause or suffer from radio or electromagnetic interference, it may replace Radio Frequency, RF, communication and RF based positioning in hospitals or other areas prone to RF radiation or where RF data transmission is even forbidden.

In a VLC based positioning system, typically a light source of each lighting device, such as a Light Emitting Diode, LED, light source transmits a modulated light positioning signal representing Identification Data, ID, identifying the lighting device. The modulation is carried out at such a high frequency not causing visible flicker.

In a proximity only VLC system, for example, wherein each lighting device transmits its own, unique ID, a mobile terminal device, for example, comprising a visible light receiver, from processing the ID of light signals received while moving through an area covered by the VLC system, and additional positioning information of the respective lighting devices and associated ID, may calculate its position in the area. The additional positioning information and associated IDs may be stored in the terminal device or received from a central database or node, for example.

In present indoor visible light positioning systems, for example, several processing algorithms are proposed for more accurately calculating the geographical position or coordinates of a visible light receiver, such as using the Received Signal Strength, RSS, Time of Arrival, ToA, Time Difference of Arrival, TDoA, and Angle of Arrival, AoA, information gained from a received light signal, and triangulation, fingerprinting by using specific characteristics of the light signals at a particular location, probabilistic methods, data correlation techniques, and vison analysis using detection camera's, for example.

In a typical scenario, wherein each or a plurality of adjacent lighting devices transmit their own, unique ID light signal, such as lighting devices mounted a the ceiling of a building, in an area of overlap of two or more lighting devices, a visible light receiver comprised of a single photodetector, for example, is not able to decode the light signals received from different light sources.

International patent application WO2016/086276 A1, for example, discloses on optical receiver, having an anterior light entrance surface comprising one or a plurality of apertures and an oppositely spaced posterior light receiving surface comprising a two-dimensional array of optical receiving elements or photodetectors, such as photodiodes. In this way, light rays obliquely incident at an anterior entrance surface aperture are spread apart over a distance at the posterior light receiving surface, i.e. the array of photodetectors, for decoding the light signals.

This solution, however, works only well for light rays of different light sources incident at a relative large angle with respect to the surface normal of the light entrance surface, and the angles of incidence of which substantially differ from each other. Light rays from different light sources in an area of overlap incident at the light entrance surface, in particular overlapping light rays having a relative small angle with respect to the normal at the light entrance surface, or light rays that just slightly differ with respect to each other will, however, by such apertures not be sufficiently spread apart at the posterior surface, for distinguishing same for decoding purposes.

Further, the amount of light that is received at a particular optical element depends on the angle of incidence of a light ray.

US patent application 2009/0123156 A1 discloses a relatively expense, bulky and complex motor driven two-dimensional array of photodetectors, arranged for moving the array in a position to maximize the amount of light received at a particular photodetector from a converging lens mounted in front of the array, viewed in the direction of propagation of the incident light rays.

Maximizing the amount of light received at a photodetector is beneficial for keeping the active area size of a photodetector, such as a photodiode or phototransistor, for example, as small as possible, thereby decreasing internal resistance, resulting in a decreased time constant and hence an increased operational speed of the photodetector, which is advantageous for position based VLC applications.

SUMMARY

It is an object of the present disclosure to provide an improved, cost-effective and high performance photodetector based visual light receiver, in particular for use in VLC based positioning, suitable for decoding ID information carrying light signals emitted in an area of overlap of two or more lighting devices of a VLC system.

In a first aspect, there is provided a receiver for visible light communication, comprising:

a photodetector array, having a plurality of photodetectors sequentially arranged in a first direction and each photodetector extending over a distance in the first and a second direction, different from the first direction, for receiving and converting a visible light signal into an electrical signal;

a processor, arranged for processing the electrical signal, and a visible light transmissive structure, arranged for receiving and directing at the photodetector array visible light rays comprising a visible light signal, the visible light transmissive structure comprising a light entrance surface and a light exit surface, arranged for spreading apart in the first direction and diverging in the second direction, at the exit surface, light rays entering the light entrance surface at different angles of incidence.

The visible light transmissive structure disclosed provides for a dual spreading or diverging of incident light rays. Light rays of different light sources in an area of overlap, for example, that incident the visible light transmissive structure at different angles with respect to the surface normal at the light entrance surface, are separated along the first direction of the photodetector array, so as to exit the visible light transmissive structure spaced apart in the first direction. Such that the light rays of the different light sources are received by a different one of the photodetectors of the photodetector array positioned opposite the exit surface.

To optimize the amount of light of a spaced apart light ray incident at a particular photodetector of the array of photodetectors, the light rays are diverged by the visible light transmissive structure along the second direction, such to cover a large as possible part of the surface area of the respective photodetector. Thereby enabling optimization of the performance of a photodetector in terms of active area size and operational speed thereof and to address tolerances in the position of a photodetector in the second direction, for example. That is, for example, the active area of the photodetectors of the photodetector array may be made relatively small, thereby providing a relatively high operational speed, as the visible light transmissive structure directs a relatively large amount of light at the photodetectors.

For the purpose of the present disclosure, the term photodetector or photosensor is to be construed as a device that, when included in a detection circuit, converts varying light signals that impinge on or hit the active area thereof into a varying voltage or current, for example. Photodetectors may be classified by their mechanism of detection, such as phototransistors acting as an amplifying photodiode; charge-coupled devices, CCDs, having a photoelectron generating layer, and other photoemissive, photovoltaic or photoelectric detectors or sensors.

In an embodiment of the receiver, viewed from the outside of the visible light transmissive structure, the light entrance surface comprises a concave shape in the first direction and the light exit surface comprises a convex shape in the second direction.

By using curved light transmissive surfaces, the spreading of the incident light rays can be effectively controlled and set by varying the curvature of the surface. This is, in particular, beneficial for spreading apart light rays of different lighting devices in an area of overlap that enter the receiver, i.e. the light entrance surface thereof, under angles that just slightly differ from each other, or enter under small angles of incidence with respect to the surface normal. For covering a large as possible part of the optical active surface area of a photodetector, the curvature of the exit surface can be optimally set, independent from the curvature of the light entrance surface.

In an embodiment of the receiver, the light entrance surface comprises a semi-cylindrical concave shape, a longitudinal axis thereof extending in the second direction. That is, the concave surface is formed as part of a cylinder surface, i.e. a semi-cylindrical surface, a longitudinal axis of which extends in the second direction and the curvature part of which extends in the first direction. In this way, light rays entering the light entrance surface in a plane of incidence orthogonal or transverse to the longitudinal axis of the semi-cylindrical light entrance surface, are deflected and diverged along the first direction. Accordingly, the visible light transmissive structure operates as a spatial filter, spacing apart in the first direction light rays incident in virtual planes transverse to the longitudinal axis of the cylindrical structure.

In a further embodiment of the receiver, the light exit surface comprises a plurality of adjacently arranged sub-surfaces, each sub-surface comprises a convex shape in the second direction, seen from the outside of the visible light transmissive structure. The sub-surfaces each allow for being optimally designed for diverging the spread apart light rays across the optical active surface area of a particular photodetector.

In an embodiment of the receiver, for enhancing the capture of light from lighting fixtures that are not positioned in-line, i.e. lighting fixtures that are for example staggered positioned in the second direction, the light exit surface comprises a semi-cylindrical convex shape, a longitudinal axis thereof extending in the first direction.

In another embodiment of the receiver, the sub-surfaces comprise a semi-cylindrical convex shape, a longitudinal axis thereof extending in the first direction. When combined with the semi-cylindrical concave shaped light entrance surface disclosed above, the longitudinal axes of the semi-cylindrical sub-surfaces are aligned with the planes of incidence transverse to the longitudinal axis of the semi-cylindrical concave shaped light entrance surface, such that the light rays at the exit surface are effectively channelled in a space defined by a convex semi-cylindrical sub-surface of the exit surface of the visible light transmissive structure.

In such an embodiment, light rays incident from the different lighting devices in several parallel planes in an area of overlap are effectively spaced apart and directed across a particular photodetector, such that light signals transmitted can be effectively decoded.

In an embodiment, the photodetector array is a linear array of spaced apart photodetectors extending in the first direction. Such a receiver is, for example, optimally arranged for decoding light signals emitted by lighting devices, both indoors and outdoors, which are sequentially arranged in longitudinal direction, such as at a corridor, in a utility tunnel, at the street, at a high-way, or the like.

A compact embodiment of the receiver is characterized in that the light entrance surface and the light exit surface are spaced apart over a particular distance and oppositely arranged.

The spatial light ray filtering properties of the visible light transmissive structure may be further enhanced by applying a diaphragm positioned in front of the light entrance surface, viewed in the direction of incidence of the light rays at the receiver. The diaphragm may comprise a light transmissive aperture for limiting the dimensions of a bundle of light rays incident at the light entrance surface. For example, a circular aperture having a diameter ranging from 0.5-8 mm, typically 1 or 5 mm, or an elongated slit or slot type aperture, extending in the first direction, and having dimensions of about 2-10 mm long and up to 0.5-5 mm wide, for example.

In an embodiment of the receiver that is suitable for a wide range of practical applications, the visible light transmissive structure is in particular arranged for spreading light rays incident at each of an angle of 0 degrees, 30 degrees and 60 degrees with respect to a principal axis of the light entrance surface for being received by a different one of the photodetectors of the photodetector array, and for diverging each the spread light rays at a respective photodetector.

As will be appreciated, the visible light transmissive structure of the receiver can be manufactured as a single piece of optically transparent material, such as glass, for example silicate glass or the like, or as a transparent plastic or polymer material like polymethyl methacrylate, PMMA, or polycarbonate, PC, or polyethylene terephthalate, PET, in particular as an extrusion product by an extrusion process. This makes that the receiver as disclosed can be produced in a very cost-efficient manner, which makes same suitable for use at large scale, for example for use in VLC based positioning for a variety of devices.

In an embodiment, the processor of the receiver is arranged for extracting an identification signal from a converted received visible light signal. The processor may be arranged and programmed for processing of decoded or identified light signals for communication and/or positioning purposes, as indicated in the background part of the present disclosure.

In a second aspect, there is provided a terminal device, in particular a mobile terminal device, comprising a receiver in accordance with any of the previous claims. It will be appreciated that the algorithms for decoding and processing light signal data may also be comprised in a processor of the terminal device.

In a third aspect there is provided a visible light transmissive structure for use in a visible light receiver arranged and constructed as disclosed above.

A fourth aspect of the present disclosure relates to a visible light communication system, comprising at least one lighting device arranged for transmitting visible light signals and at least one receiver as disclosed above.

In accordance with a fifth aspect, there is provided a method of processing a visible light signal of a visible light communication system comprised by light rays incident on a visible light receiver, the receiver comprising a photodetector array having a plurality of photodetectors sequentially arranged in a first direction and each photodetector extending over a distance in the first and a second direction, different from the first direction, for receiving and converting a visible light signal into an electrical signal, the method comprising:

optically spreading apart in the first direction light rays entering the light receiver at different angles of incidence, optically diverging in the second direction the spread apart light rays, and processing an electrical signal converted by the respective photodetector from a visible light signal of the light rays received at a respective photodetector by extracting and identification signal from the electrical signal and processing same.

The above and other aspects of the disclosure will be apparent from and elucidated with reference to the embodiments described hereinafter.

DETAILED DESCRIPTION

Figure 1:
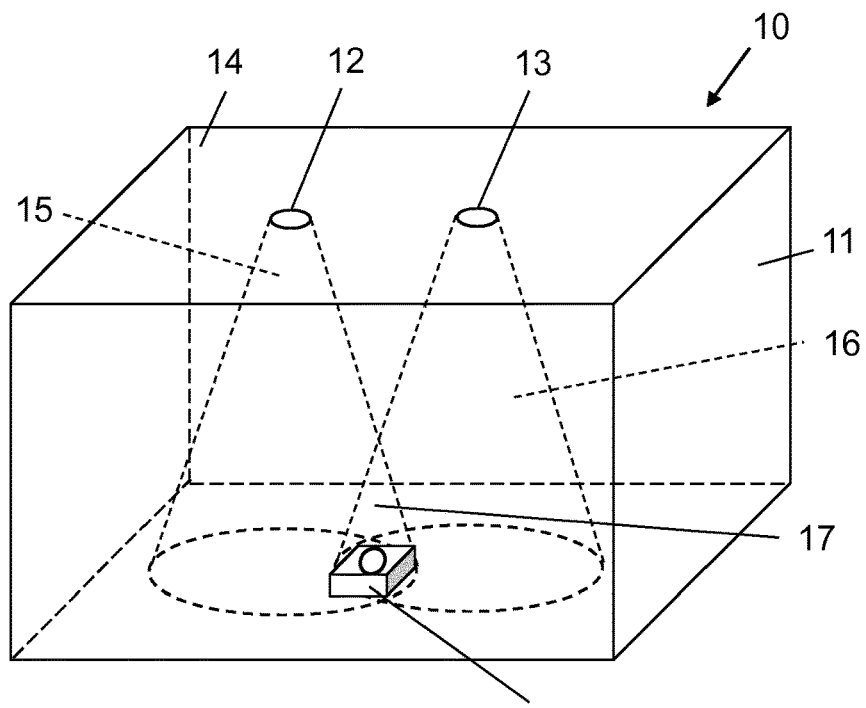
FIG. 1 shows a typical application scenario of an indoor Visible Light Communication, VLC, system.

Reference numeral 10 in FIG. 1 designates an example of typical indoor Visible Light Communication, VLC, system. The VLC system comprises a plurality of lighting devices 12, 13 mounted at the ceiling 14 of a space or room 11. Besides for lighting of the room 11, the lighting devices 12, 13, i.e. the light sources thereof, such as Light Emitting Diodes, LEDs, emit amplitude, phase and/or frequency modulated light rays 15, 16 producing light signals for communication purposes.

In a VLC based positioning system, for example, the modulated light signals of a lighting device 12, 13 transmit Identification Data, ID, uniquely identifying a particular lighting device 12, 13 of the VLC system 10.

In a basic embodiment of the VLC system 10, the geographic position and direction of movement of a visible light receiver 18 moving, for example, from left to right in the room 11, can be established from receiving and decoding the ID of the light signals received by the receiver 18 while moving, and additional geographic positioning information of the lighting devices 12, 13 associated with their ID.

In the room 12, in the area designated by reference numeral 17, the light rays 15, 16 overlap each other. A receiver 18, present in the area of overlap 17 and comprising a photodetector arranged for converting a received visible light signal into an electrical signal, is not able to decode the light signals of both lighting devices 12, 13 received simultaneously, such that the position of the receiver 18 in the area of overlap 17 cannot be determined by the VLC system 10.

Figure 2:
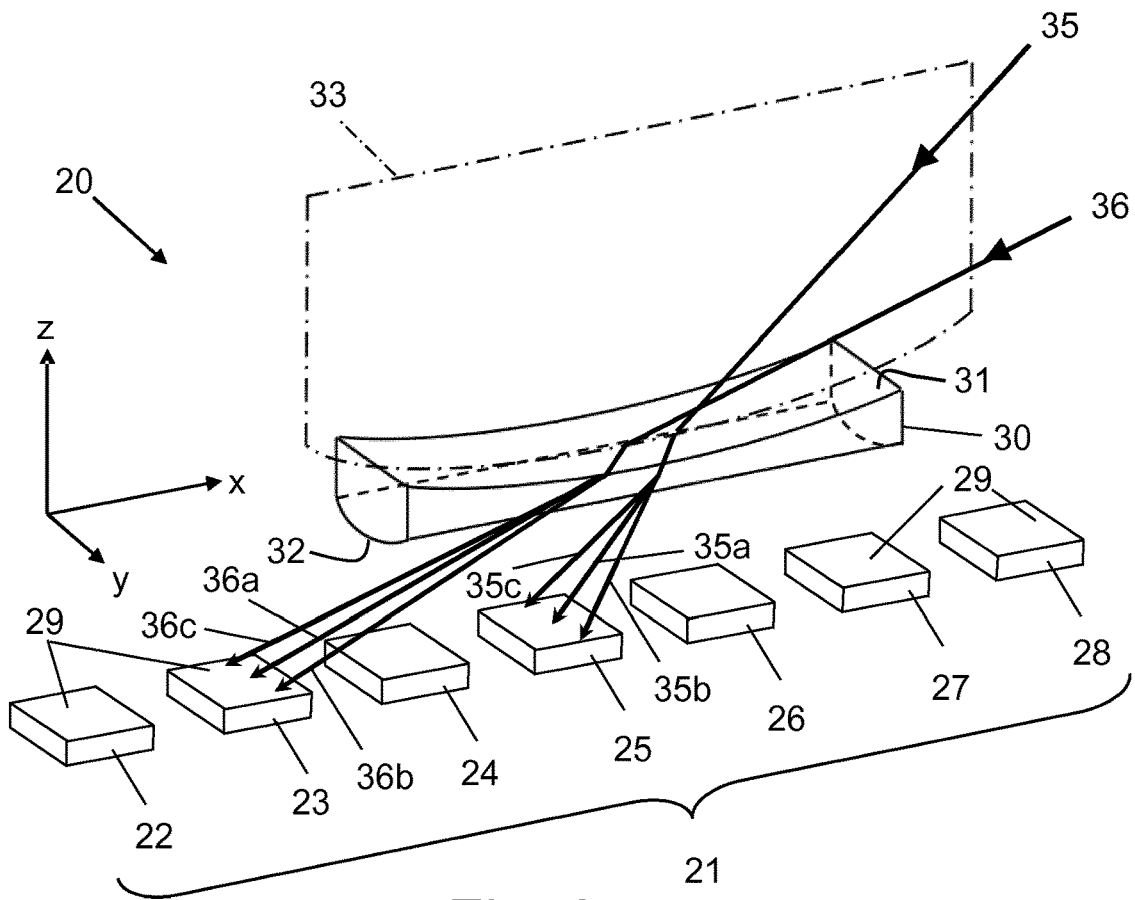
FIG. 2 shows in a schematic, perspective view the optical light receiving parts of a visible light receiver in an embodiment of the present disclosure, with incident light rays.

FIG. 2 shows the optical components of a first embodiment of a visible light receiver 20 in accordance with the present disclosure. The light receiver 20 comprises a photodetector array 21, having a plurality of sequentially arranged, spaced apart photodetectors, for example seven photodiodes 22-28, each arranged for converting a visible light signal, received at a radiant active surface 29 of the photodiode, into an electrical signal. In the embodiment shown, the photodiode array 21 is a linear array extending along the x-coordinate of the x-, y-, z-coordinate system shown in FIG. 2. The radiant active surface 29 of each photodiode 22-28 extends over a distance in the x-direction and over a distance in the y-direction. These distances may be equal or differ, dependent on the particular size and shape of a photodiode, i.e. the radiant receiving surface 29 thereof.

In front of the photodiodes 22-28, that is in front of their radiant active surface 29, a visible light transmissive body or structure 30 is positioned. The visible light transmissive structure 30 comprises a light entrance surface 31 and a spaced, oppositely arranged light exit surface 32. The light entrance surface 31 and the light exit surface 32 and part of the structure 30 comprised between the light entrance surface 31 and the light exit surface 32 are transmissive or opaque for visible light.

In the embodiment shown, the light entrance surface 31 has a concave shape, seen from the outside of the visible light transmissive structure 30. With respect to the orthogonal x-, y-, z-coordinate system shown in FIG. 2, the light entrance surface 31 has a semi-cylindrical shape, the longitudinal axis of which extends along the y-coordinate or y-direction and the concave curvature of which extends along the x-coordinate or x-direction.

The light exit surface 32, in the embodiment shown, has a semi-cylindrical convex shape seen from the outside of the visible light transmissive structure 30. However, the curvature of the light exit surface 32 extends along the y-coordinate and the longitudinal axis of the convex semi-cylindrical light exit surface 32 extends along the x-coordinate.

For the purpose of explaining the operation of the visible light transmissive structure 30, the light rays 35, 36 are assumed to incident or impinge on the light entrance surface 31 in a virtual plane of incidence 33 extending transverse to the longitudinal axis of the semi-cylindrically shaped light entrance surface 31, i.e. a plane of incidence parallel to a plane defined by the x-z-coordinates, as shown.

In operation, following Snell's Law, the incident light rays 35, 36 are refracted apart by the visible light transmissive structure 30 in the first or x-direction. Due to the concave shape of the light entrance surface 31, the incident light rays 35, 36 will be deflected by refraction and diverged at an angle along the x-coordinate or x-direction. The value of this angle, that can be expressed with respect to the optical axis or surface normal of the light entrance surface 31 at the position of incidence of a light ray 35, 36, for example, depends on the angle of incidence of a respective light ray with respect to the surface normal, the curvature of the light entrance surface 31 at the position of incidence of the light ray and the index of refraction for visible light of the body or structure 30 and the medium through which the light rays propagate, usually ambient air. It is noted that the index of refraction, besides in vacuum, differs with the wavelength of the incident light. Hence, the amount of divergence of an incident light ray therefore also differs with the emitted light colour.

The thus deflected diverged light rays 35, 36 when incident at the light exit surface 32 are refracted and due to the convex shape of the light exit surface 32, seen external of the visible light transmissive structure 30, diverged at a further angle along the y-coordinate or y-axis. The value of this further angle can be expressed with respect to the surface normal of the light exit surface 31 at the position of incidence of a diverged light ray 35, 36 and depends on the curvature of the light exit surface 31 at the position of incidence of a diverged light ray, the index of refraction for visible light of the body of the visible light transmissive structure 30, the angle of incidence of a diverged light ray, the medium through which the light rays exit the visible light transmissive structure 30, usually ambient air, and the colour of the light, i.e. the wavelength thereof.

When the surface normal of the light exit surface 32 lies in the plane of incidence 33, a light ray 35, 36 deflected at the light entrance surface 31 travels through the body or structure 30 and is deflected again at the light exit surface 32, and leaves the light exit surface 32 in a virtual plane coinciding with the plane of incidence 33, such as the deflected or refracted light rays 35a and 36a, respectively. When the plane of incidence 33 does not coincide with the surface normal of the light exit surface 31, a deflected light ray 35, 36 will be diverged along the y-axis, such as for example indicated by light rays 35b, 35c and 36b, 36c, which correspond to different planes of incidence, respectively.

It is noted that a lighting device, such as the lighting devices 12, 13 shown in FIG. 1, in practice, will emit a bundle of light rays 15, 16 impinging on the light entrance surface 31 in respective planes of incidence that include angle with both the surface normal at the light entrance surface 31 and the light exit surface 32. These planes of incidence are further distributed along the longitudinal axis, i.e. in the y-direction, of the light entrance surface 31, thereby effectively spreading incident light rays 35, 36 over the light exit surface 32.

As schematically illustrated in FIG. 2, the light entrance surface 31 and the light exit surface 32 of the visible light transmissive structure 30 operate in concert as curved concave/convex lenses, spreading the light rays 35, 36 in a first direction (x-direction) along the photodiode array 21, and diverging the light rays 35, 36 in a second direction (y-direction) in which each individual photodiode 22-28, i.e. the radiant active surface 29 thereof, extends. As a result, the light rays 35, 36 which enter the visible light transmissive structure 30 in an area of overlap 17 at different angles of incidence, each are directed, i.e. distributed or spread over the radiant active surface 29 of a different one of the photodiodes 22-28. Thereby optimizing the amount of light directed at a particular photodiode 22-28 for providing optimal performance thereof, for decoding light signals into electric signals, as elucidated above.

Figure 3:
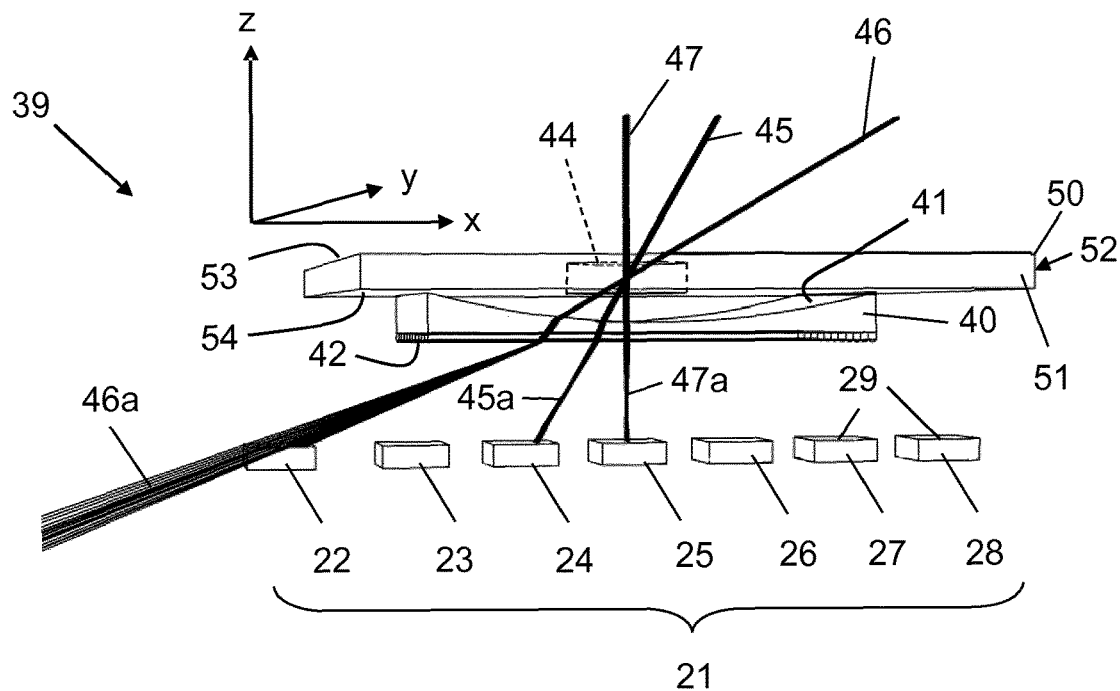
FIG. 3 shows in a schematic, perspective view the optical light receiving parts of a visible light receiver in a further embodiment of the present disclosure, with incident light rays.

FIG. 3 shows the optical light receiving parts of a visible light receiver 39 in a further embodiment of the present disclosure, with incident light rays 45, 46, 47, for example. In front of the photodiodes 22-28 of the photodiode array 21, which is in front of their radiant active surface 29, a visible light transmissive body or structure 40 is positioned. The visible light transmissive structure 40 comprises a light entrance surface 41 and an oppositely spaced light exit surface 42. The light entrance surface 41 and the light exit surface 42 and part of the structure 40 comprised between the light entrance surface 41 and the light exit surface 42 are transmissive or opaque for visible light.

In the embodiment shown, the light entrance surface 41, similar to the light entrance surface 31 of the visible light transmissive structure 30, also has a semi-cylindrical concave shape, seen from the direction of incidence of a visible light ray 45, 46, 47, extending in the same manner with respect to the orthogonal x-, y-, z-coordinate system shown.

Figure 4:
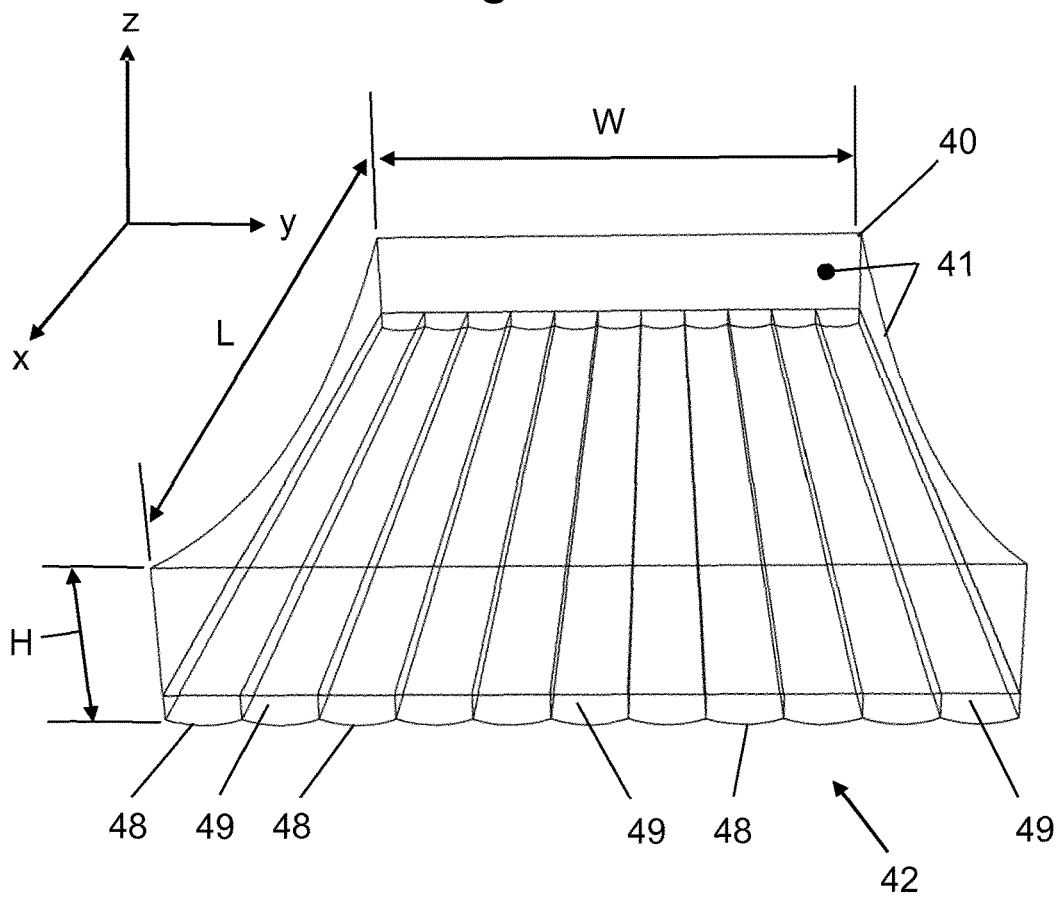
FIG. 4 shows, in a schematic, perspective view the optical, visible light transmissive structure of FIG. 3 on an enlarged scale.

The light exit surface 42, different from the light exit surface 32 shown in FIG. 2, comprises a plurality of adjacently arranged sub-surfaces 48, as shown in more detail in FIG. 4, which is an enlarged perspective view of the visible light transmissive structure 40. Each sub-surface 48, seen from the outside of the visible light transmissive structure 40, has a convex shape extending in the y-direction (i.e. the second direction) and extends rectilinear along the x-direction (i.e. the first direction) with respect to the photodiode array 21 of the visible light receiver 39.

In the embodiment shown, the sub-surfaces 48 comprise a semi-cylindrical convex shape, the longitudinal axes thereof extending along the x-coordinate or x-direction and form adjacent light guiding channels 49.

The length, L, and width, W, of the visible light transmissive structure 40 may be substantially equal, for example ranging between 20-30 mm, such to cover and spread a particular range of angles of incidence of light rays 45, 46, 47. In an embodiment, photodetectors such as photodiodes having an optical or radiant active surface of 2-10 mm² may be applied in the receiver according to the present disclosure.

In front of the light entrance surface 41, the visible light receiver 39 comprises a diaphragm 50, having a through light transmissive aperture 44 opening in an upper surface 53 and a bottom surface 54 of the diaphragm 50, viewed in the plane of the drawing, for receiving light rays 45, 46, 47 incident at the receiver 39, and for directing same onto the entrance surface 41 of the visible light transmissive structure 40. The diaphragm 50, i.e. the upper surface 53 and the lower surface 54 thereof, may be rendered opaque, for example coated or covered a material that does not transmits visible light.

The aperture 44, that is shown as a circular aperture, operates to limit the dimensions of a bundle of light rays 45, 46, 47 incident at the light entrance surface 41, such to set an effective operational range of the light receiver, for example for spreading light rays incident at each of an angle of 0 degrees, 30 degrees and 60 degrees with respect to a principal axis of the light entrance surface for being received by a different one of the photodiodes 22-28 of the photodiode array 21, and for diverging each of the spread light rays 45, 46, 47 at a respective photodiode.

Figure 5:
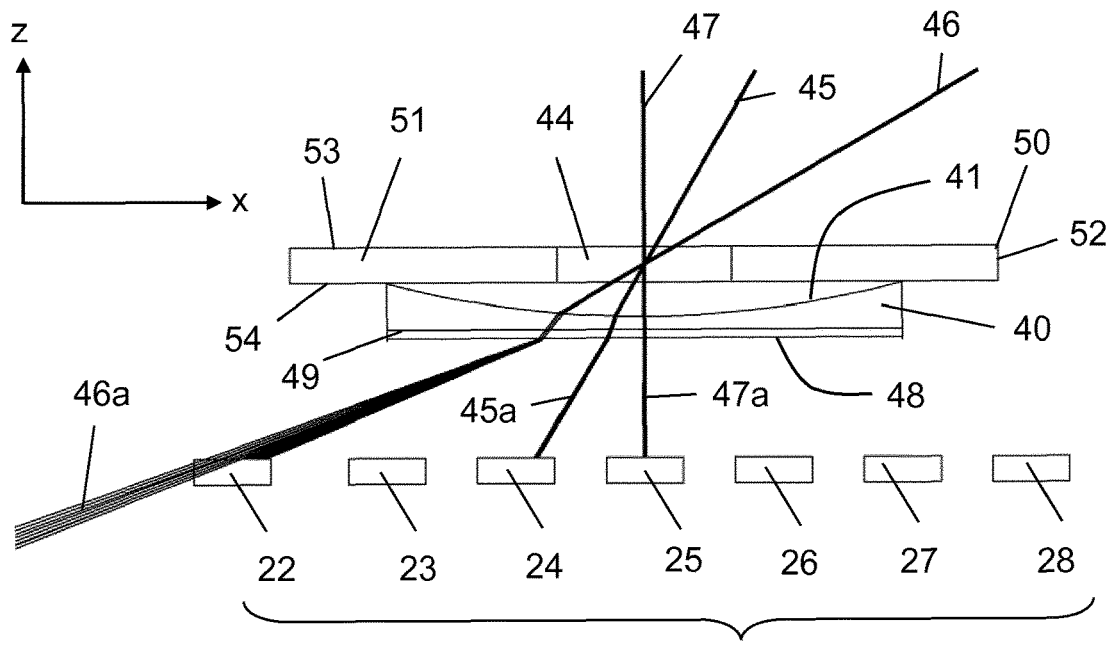
FIG. 5 shows a front view of the optical light receiving parts and incident light rays of the visible light receiver shown in FIG. 3.
Figure 6:
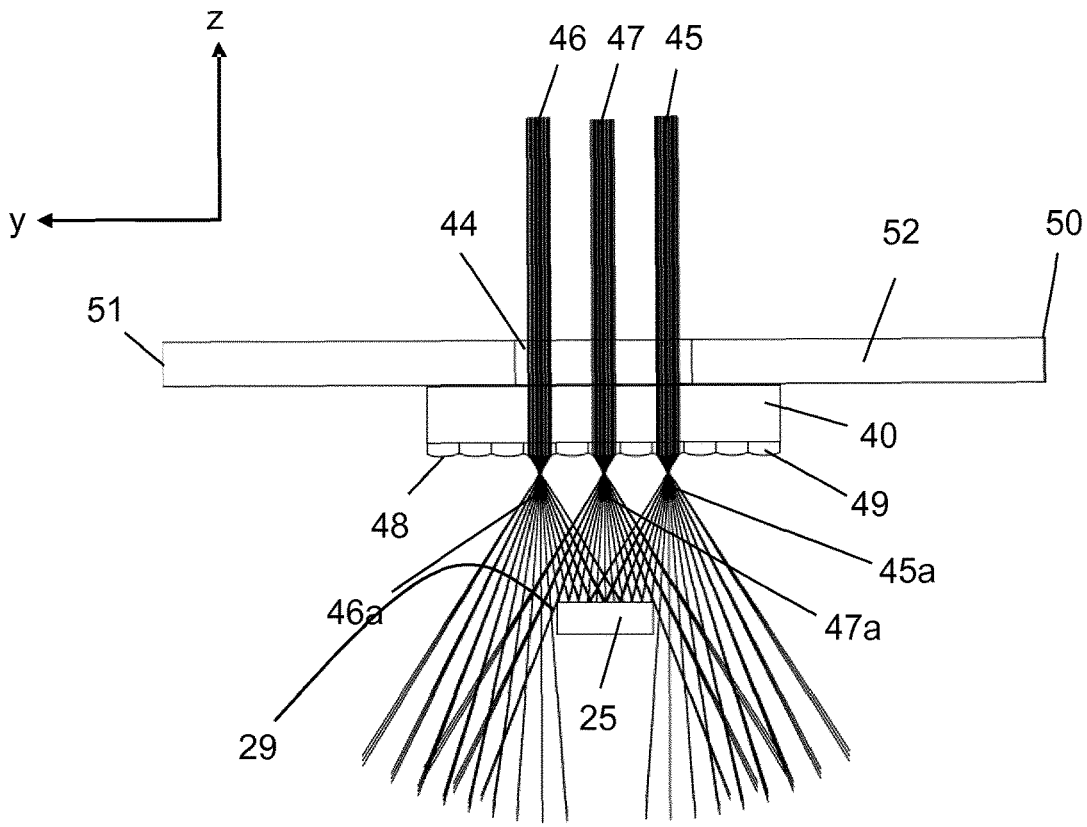
FIG. 6 shows a side view of the optical light receiving parts and incident light rays of the visible light receiver shown in FIG. 3.

The operation of the light receiver 39 is further illustrated with respect to FIGS. 5 and 6. FIG. 5 is a front view of the visible light receiver 39, viewed at the front side 51 of the diaphragm 50, as shown in FIG. 3.

In a same manner as explained with respect to FIG. 2, the light rays 45, 46, 47 that enter the aperture 44 incident at different angles at the concave light entrance surface 41 are twice refracted and diverged, and leave the light exit surface 41 as refracted or deflected light rays 45a, 46a, 47a, i.e. spread apart in x-direction, i.e. in the direction in which the photodiodes 22-28 of the photodiode array 21 are spaced apart. That is, the deflected light rays 45a are directed at photodiode 24, the deflected light rays 46a are directed at photodiode 22 and the deflected light rays 47a are directed at photodiode 25.

The height H of the body of the visible light transmissive structure 40, substantially measured between the light entrance surface 41 and the light exit surface 42, and the radius of curvature of the light entrance surface 41, determines the amount of deflection of a particular light ray. That is, the deflection of a light ray increases with an increase of the distance between the light entrance surface 41 and the light exit surface 42. In an embodiment, the curvature of the light entrance surface 41 amounts 0.01-0.5 (1/mm), for example, while the height H is set between 1.5 and 5 mm, for example. The curvature of the light exit surface may have a radius of, for example, 5-100 mm. In a semi-cylindrical embodiment, the light exit surface may have a length in longitudinal direction ranging from 0.3-5 mm, for example.

FIG. 6, in a side view at the side 52 of the diaphragm 50 shown in FIG. 4, schematically illustrates how the deflected light rays 45a, 46a, 47a are spread or diverged over the radiant active surface 29 of a particular photodiode, viewed in y-direction. Due to the channel or tunnel effect of the semi-cylindrical sub-surfaces 48 of the visible light transmissive structure 40, the diverged deflected light rays 45a, 46a, 47a are effectively spread over the radiant active surface 29 of a particular photodiode. Thereby optimizing the amount of light transmitted through the aperture 44 at a particular photodiode of the photodiode array 21.

It will be appreciated that the shape and dimensions of the aperture 44 can be optimally adapted to the shape and dimensions of the exit surface 42 of the visible light transmissive structure 40 and the arrangement and shape of the radiant active surfaces of the photodiodes of the photodiode array 21.

The visible light transmissive structure 30, 40 of the visible light receiver 20, 39 can be manufactured as a single piece of optically transparent material, such as a visible light transparent plastic material like polymethyl methacrylate, PMMA, also known as acrylic or acrylic glass or polycarbonate, PC, or polyethylene terephthalate, PET, or also of glass such as silicate glass or the like. The visible light transmissive structure 30, 40 may be manufactured by an extrusion process or from a 3D printing process, for example.

Figure 7:
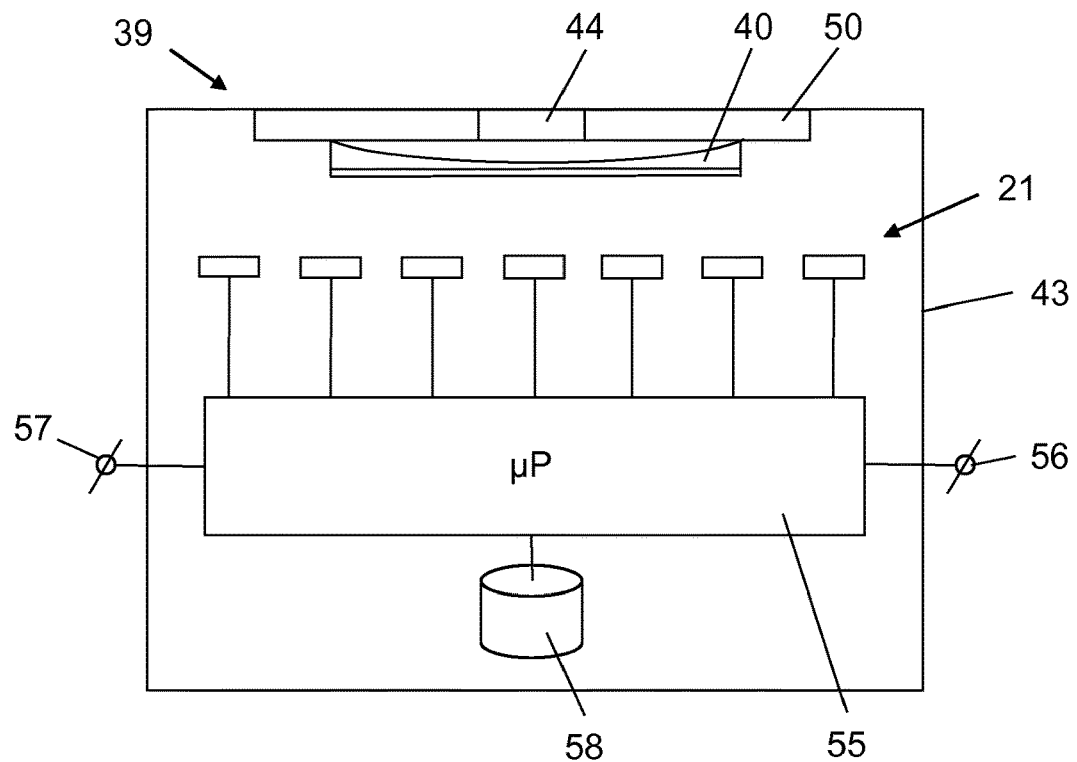
FIG. 7 shows the visible light receiver shown in FIG. 3, comprising a processor, arranged for processing electrical signals converted from light signals received by the photodetector array of the receiver.

FIG. 7 shows the visible light receiver 39, comprising the visible light transmissive structure 40, the diaphragm 50 and the photodiode array 21 disclosed above, arranged in a housing 43. The aperture 44 of the diaphragm 50 is accessible external from the housing 43, for receiving light rays comprising light signals of a VLC system, such as the VLC system 10, for example.

The visible light receiver 39 further comprises a processor 55, such as a microprocessor, µP, microcontroller, or any other programmable data processing device, to which the photodiodes of the photodiode array 21 electrically connect. The processor 55 is arranged for processing the electrical signals produced from light signals received by the photodiodes of the photodiode array 21. For powering and data input/output purposes, the processor 55 connects to a powering interface 57 and a data communication interface 56.

The processor 55 further connects to a data storage or memory 58, among others for storing program data of the processor 55, for processing and extracting identification signals from received and converted visible light signals, for example. The storage 58 may also comprise one or a plurality of processing algorithms for calculating the geographical position or coordinates of a visible light receiver in a VLC system, such as disclosed in the summary part of the present disclosure, for example.

It is noted that the housing 43 may represent a terminal device, in particular a mobile terminal device, such as a mobile telephone or a mobile device operating in a particular geographical area, such a robot device for cleaning purposes operating in a room or the like, or a device operative in accordance with the so-called Internet of Things, IoT, protocol.

Figure 8:
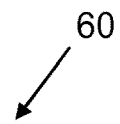
FIG. 8 shows a simplified flow chart diagram illustrating an example of the steps performed in a method according to the present disclosure.

FIG. 8 illustrates in a simplified flowchart type diagram 60, the basic steps of a method of processing a visible light signal or light signals of a VLC system, comprised by light rays incident on a visible light receiver. The receiver comprising a photodiode array having a plurality of photodiodes sequentially arranged in a first direction and each photodiode extending over a distance in said first and a second direction, different from said first direction, for receiving and converting a visible light signal into an electrical signal.

The direction of flow in the flow chart diagram 60 is assumed from the top to the bottom of the sheet. In a first step, indicated by reference numeral 61, light rays comprising light signals are received. The thus received light rays, in a second step 62, are optically spread apart in said first direction, while in a third step 63, the thus spread apart light rays are optically diverged in said second direction.

An optical signal thus directed to and received at a respective photodiode is converted thereby in an electrical signal and processed, as indicated in the fourth step 64, for example by extracting an identification signal from said electrical signal and processing same.

The method may be optically implemented in and performed by suitable optical components and electrically under the control of a software program or code, executed in the microcontroller or micro-processor 42 of a terminal device 43, for example.

Figure 9A:
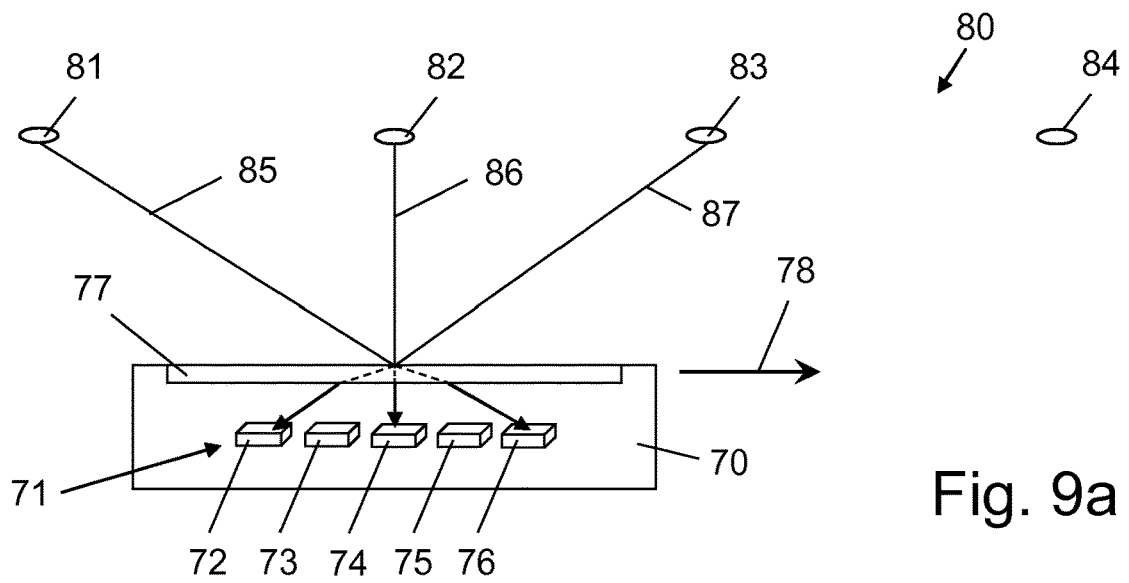
FIGS. 9a, 9b and 9c show a typically application scenario of the visible light receiver in a VLC system in accordance with the present disclosure.
Figure 9B:
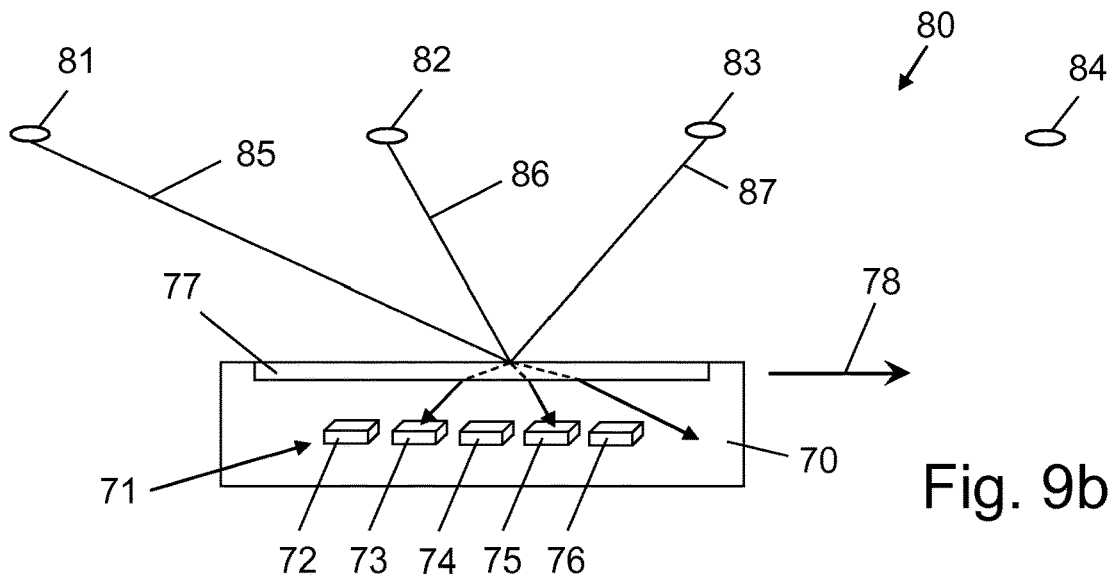
Figure 9C:
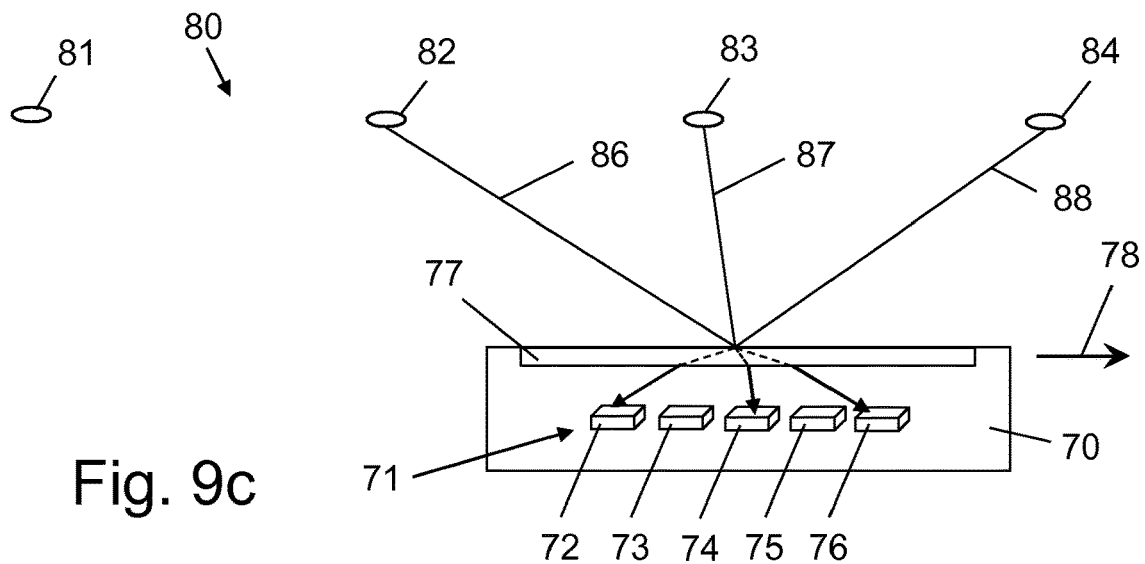

FIGS. 9a, 9b, 9c illustrate in a schematic manner, the operation of a visible light receiver 70 in accordance with the present disclosure. The receiver 70 comprises a linear photodiode array 71, comprised of spaced apart photodiodes 72-76 and an optical visible light transmissive structure 77 of the type in accordance with the present disclosure, such as shown and described with reference to FIGS. 2 and 3, for example.

A VLC system 80 comprised of lighting devices 81, 82, 83 and 84 transmits light signals in the form of data uniquely identifying a respective lighting device 81, 82, 83 and 84. That is, each lighting device 81, 82, 83 and 84 respectively transmits light rays 85, 86, 87 and 88 comprising ID data corresponding to the particular lighting device.

When the visible light receiver 70, i.e. a mobile device in which the receiver 70 is incorporated, moves across the lighting devices 81, 82, 83, 84 in a direction indicated by arrow 78, due to the operation of the light receiver 70 in accordance with the present disclosure, overlapping light rays at the receiver 70, i.e. the optical light transmissive structure 77 are each received by a respective one of the photodiodes 72-76, as illustrated.

With the receiver 70 in the position shown in FIG. 9a, photodiode 72 receives the light rays 87 of lighting device 83, photodiode 74 receives the light rays 86 of lighting device 82 and photodiode 76 receives the light rays 85 of lighting device 81.

When the receiver 70 is moved to the position shown in FIG. 9b, photodiode 73 receives the light rays 87 of lighting device 83, photodiode 75 receives the light rays 86 of lighting device 82 and none of the photodiodes receives the light rays 85 of lighting device 81.

When the receiver is moved further to the position shown in FIG. 9c, photodiode 74 receives the light rays 87 of lighting device 83, photodiode 76 receives the light rays 86 of lighting device 82 and photodiode 72 now receives light rays 88 from a new lighting device 84.

As can be seen, the light rays of a particular lighting device are always received at a particular one of the photodiodes of the photodiode array 71 of the receiver 70, such that the light signals of a particular lighting device can be decoded by the processor of the receiver 70 (not explicitly shown in FIGS. 9a, 9b, 9c). From the thus decoded IDs, from the order in which the photodiodes 72-76 subsequently receive the IDs of the respective lighting devices 81-84, and geographical position information of the lighting devices 81-84 in a room, for example, the position and the direction of movement 78 of the receiver can be easily determined, The position of the receiver can be even more accurately determined while taking into account the angle of incidence of a particular light ray, to which end the light transmissive structure 77 may be designed for directing to a particular one of the photodiodes 72-76 light rays entering at a particular, known angle, such as 30°, 45°, 60°, 75° or other suitable angle, for example.

While the disclosure has been illustrated and described in detail in the drawings and foregoing description, such illustration and description are to be considered illustrative or exemplary and not restrictive; the disclosure is not limited to the disclosed embodiments.

For example, it is possible to operate the disclosure in an embodiment wherein the light entrance and light exit surface of the visible light transmissive structure are not oppositely spaced, such as in a prism type structure. The light exit surface may also have a paraboloid shape or the like. The photodiodes of a photodiode array may be arranged in a staggered manner, instead of linear, to enhance the collecting of light at a particular photodiode. The photodiode array may comprise of, for example, two or more rows of photodiodes and each row extending in the first direction, i.e. the x-direction as shown in the figures, wherein adjacent photodiodes extending in the second direction, i.e. the y-direction as shown in the figures, may be operatively coupled such to operate in parallel, for example. The term photodiode as used in the description to the figures is to be construed by way of example and may be replaced by any other photosensor or photodetector or optical element for converting a received light signal into an electric signal.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A receiver for visible light communication, comprising:
   a photodetector array, having a plurality of photodetectors sequentially arranged in a first direction and each photodetector extending over a distance in said first and a second direction, different from said first direction, for receiving and converting a visible light signal into an electrical signal;
   a processor, arranged for processing said electrical signal, and
   a visible light transmissive structure, comprising a light entrance surface and a light exit surface, arranged for receiving and directing at said photodetector array visible light rays comprising a visible light signal,
   said visible light transmissive structure arranged for spreading apart in said first direction and diverging in said second direction, at said exit surface, light rays entering said light entrance surface at different angles of incidence.

2. The receiver according to claim 1, wherein said light entrance surface comprises a concave shape in said first direction and said light exit surface comprises a convex shape in said second direction, seen from outside of said visible light transmissive structure.

3. The receiver according to claim 2, wherein said light entrance surface comprises a semi-cylindrical concave shape, a longitudinal axis thereof extending in said second direction.

4. The receiver according to claim 2, wherein said light exit surface comprises a semi-cylindrical convex shape, a longitudinal axis thereof extending in said first direction.

5. The receiver according to claim 2, wherein said light exit surface comprises a plurality of adjacently arranged sub-surfaces, each sub-surface comprises a convex shape in said second direction.

6. The receiver according to claim 5, wherein said sub-surfaces comprise a semi-cylindrical convex shape, a longitudinal axis thereof extending in said first direction.

7. The receiver according to claim 1, wherein said light entrance surface and said light exit surface are oppositely and at a distance from each other arranged.

8. The receiver according to claim 1, further comprising a diaphragm in front of said light entrance surface of said light transmissive structure, for receiving light rays incident at said receiver, said diaphragm comprising a light transmissive aperture for directing received light rays at said light entrance surface.

9. The receiver according to claim 1, wherein said first and second direction are orthogonal.

10. The receiver according to claim 9, wherein said visible light transmissive structure is arranged for spreading light rays incident at each of an angle of 0 degrees, 30 degrees and 60 degrees with respect to a principal axis of said light entrance surface for being received by a different one of said photodetectors of said photodetector array, and for diverging each said spread light rays at a respective photodetector.

11. The receiver according to claim 1, wherein said processor is arranged for extracting an identification signal from a converted received visible light signal.

12. A mobile terminal device, comprising a receiver in accordance with claim 1.

13. A visible light transmissive structure arranged in accordance with claim 1, in particular wherein said visible light transmissive structure is a single piece of material manufactured from optically transparent material.

14. A visible light communication system, comprising at least one lighting device arranged for transmitting visible light signals and at least one receiver in accordance with claim 1.

15. A method of processing a visible light signal of a visible light communication system comprised by light rays incident on a visible light receiver, said receiver comprising a photodetector array having a plurality of photodetectors sequentially arranged in a first direction and each photodetector extending over a distance in said first and a second direction, different from said first direction, for receiving and converting a visible light signal into an electrical signal, said method comprising:
    optically spreading apart in said first direction light rays entering said light receiver at different angles of incidence,
    optically diverging in said second direction said spread apart light rays, and
    processing an electrical signal converted by a respective photodetector from a visible light signal of said light rays received at said respective photodetector by extracting and processing an identification signal from said electrical signal.

* * * * *